United States Patent [19]

Lewis et al.

[11] Patent Number: 5,483,426
[45] Date of Patent: Jan. 9, 1996

[54] AIMABLE VEHICLE HEADLAMP ASSEMBLY

[75] Inventors: Brian S. Lewis, Middletown; Gary L. Miller, Lapel, both of Ind.

[73] Assignee: General Motors Corporation, Detroit, Mich.

[21] Appl. No.: 364,570

[22] Filed: Dec. 17, 1994

[51] Int. Cl.⁶ .................................................. B60Q 1/068
[52] U.S. Cl. .............................. 362/66; 362/421; 362/69; 74/89.13; 74/89.15; 74/606 R
[58] Field of Search .................................. 362/66, 69, 418, 362/421; 74/89.13, 89.15, 606 R

[56] References Cited

U.S. PATENT DOCUMENTS

| | | | |
|---|---|---|---|
| 4,703,399 | 10/1987 | Van Duyn et al. | 362/66 |
| 4,939,945 | 7/1990 | Ryder et al. | 74/89.13 |
| 4,980,804 | 12/1990 | Dobler | 362/69 |
| 5,065,293 | 11/1993 | Mochizuki | 362/273 |
| 5,414,602 | 5/1995 | Young et al. | 362/66 |

*Primary Examiner*—Ira S. Lazarus
*Assistant Examiner*—Sara Sachie Raab
*Attorney, Agent, or Firm*—Ernest E. Helms

[57] ABSTRACT

A vehicle headlamp assembly is provided including a horizontal adjustment device for adjusting the position of a reflector, the adjustment device including a housing having an open bottom, a front wall and a rear wall, the front and rear walls having an aligned bore, the housing also having a top with a slot intersecting one of the walls, the wall intersected by the top slot having a horizontal slot adjacent the top slot greater than the top slot; a top gear having a head which is passable through the horizontal slot, the top gear also having a shaft slidable into the top slot; and a sleeve gear insertable through the housing bottom, the sleeve gear having a head for meshing engagement with the top gear, the sleeve gear having connected to the head a barrel body for supporting the head of the top gear.

2 Claims, 3 Drawing Sheets

AIMABLE VEHICLE HEADLAMP ASSEMBLY

FIELD OF THE INVENTION

The field of the present invention is that of vehicle headlamp assemblies and more particularly adjustment mechanisms associated therewith.

BACKGROUND OF THE INVENTION

Vehicle headlamps require horizontal and vertical adjustment to meet U.S. government legal aiming regulations. Headlamps frequently use angled gear drive adjusters for aiming.

Aiming is generally done with a simple tool or wrench by turning a screw or other similar device located behind the headlamp. Access to this area is important for without sufficient space to hand access, one cannot reach the adjuster in order to aim the headlamp. Right angle gear drives solve this problem as they need no rear access for adjustment. The drive shaft from the gear drive extends to the top of the headlamp for one to turn, which in turn moves the adjusting screw. The movement of the adjusting screw aims the headlamp.

The above-noted gear drives generally consist of two helical gears that are held in an engaged position in a housing. Some of these housings have sonic welded caps that permit loading of the gears and internal bushings.

The problem with previous gear drive adjusters is that their assembly involves a number of operations. The housing is designed to use several caps as covers over the pockets that contain the gears. The pockets are sealed when the caps are sonic welded to the housing, which can put the gears in a bind (if too tight) or result in a loose gear, which creates headlamp flutter, if improperly mounted to the housing.

SUMMARY OF THE INVENTION

The present invention provides a vehicle headlamp assembly permitting a simplified assembly of a right angle gear drive adjuster, eliminating the need for sonic welded caps for the adjuster. The present invention eliminates the need for extra parts (caps) and the need for their attachment (sonic welding and various other labor-consuming operations) to the housing, which reduces piece price of the component as well as diminishing the amount of polymers needed, thereby promoting the environment efficiency of the vehicle.

These and other advantages of the present invention will be more apparent to those skilled in the art as the present invention is revealed in greater detail in the accompanying drawings and detailed description.

DESCRIPTION OF THE PREFERRED EMBODIMENT

Figure 1:
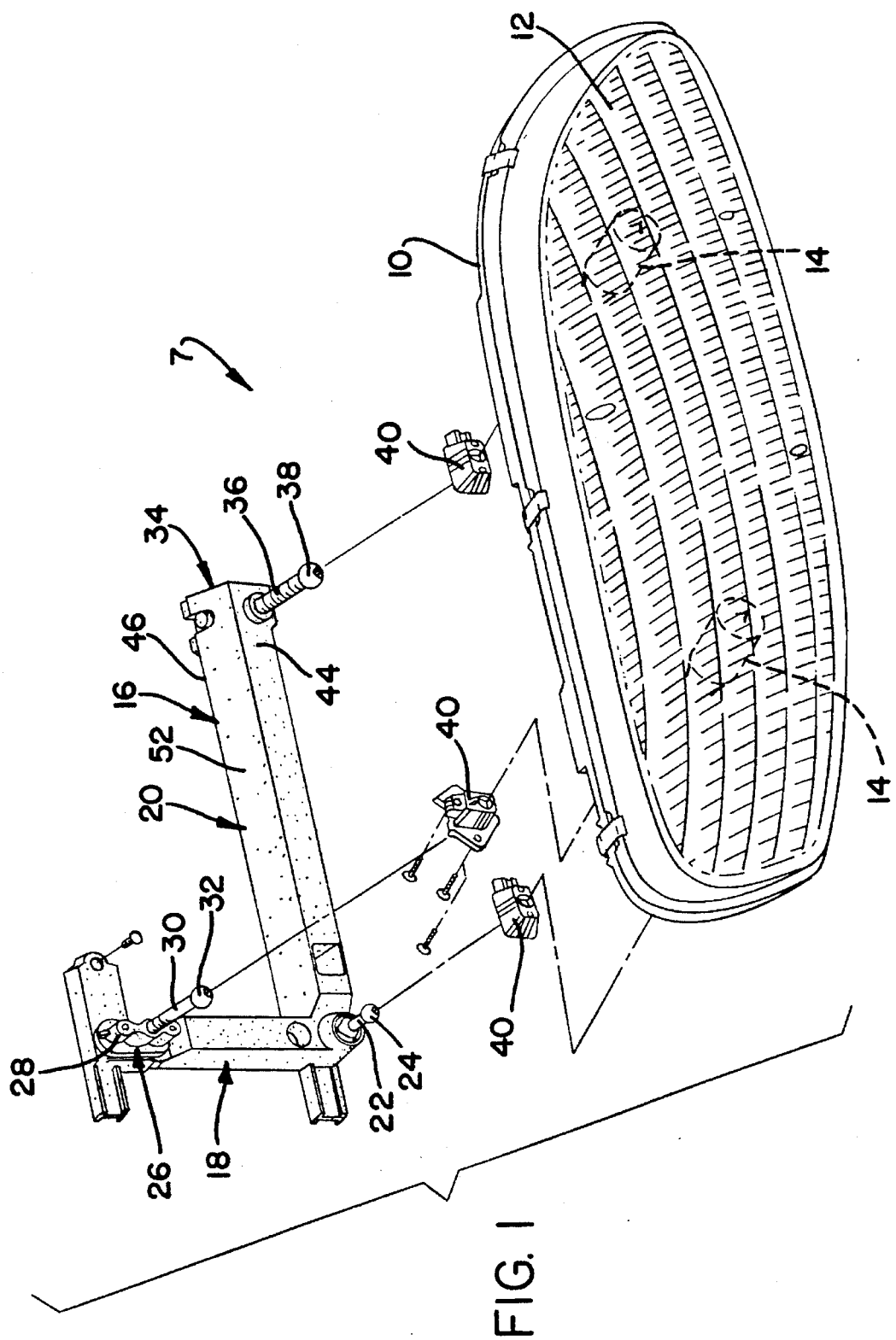
FIG. 1 is an exploded perspective view of a preferred embodiment vehicle headlamp assembly according to the present invention illustrating a reflector housing along with an accompanying lens separated from an L-shaped bracket, which is in turn fixably connected to the sheet metal or frame of the vehicle (not shown).

Referring to FIG. 1, the headlamp assembly 7 according to the present invention has a reflector housing 10 covered by a lens 12. The reflector housing has a surface (covered by the lens) which reflects a plurality of light beams from bulbs 14 (shown in phantom). The lens 12 then focuses these beams into a suitable pattern. Connecting the reflector housing 10 to the vehicle (not shown) is an L-shaped bracket 16. Bracket 16 has a generally vertical arm 18 and a horizontal arm 20. Connected to the bracket 16 is a fixed pivot rod or shaft 22 having a ball end 24. A horizontal adjuster device 26 provides an adjuster body 28 and a shaft 30 with a ball end 32. The bracket also includes a second adjuster device for adjusting the headlamp assembly in a horizontal plane. The second adjuster unit includes a shaft 36 with a ball end 38.

Ball sockets 40 are fixably connected to the reflector and in turn are connected to the ball ends 24, 32 and 38 to mount the reflector housing 10 to the vehicle. The beam emitted by the headlamp assembly 7 is adjusted in the vertical plane by the elongation or retraction of shaft 30, and the beam of the headlamp assembly 7 is adjusted in the horizontal plane by the extension or retraction of shaft 36.

Figure 2:
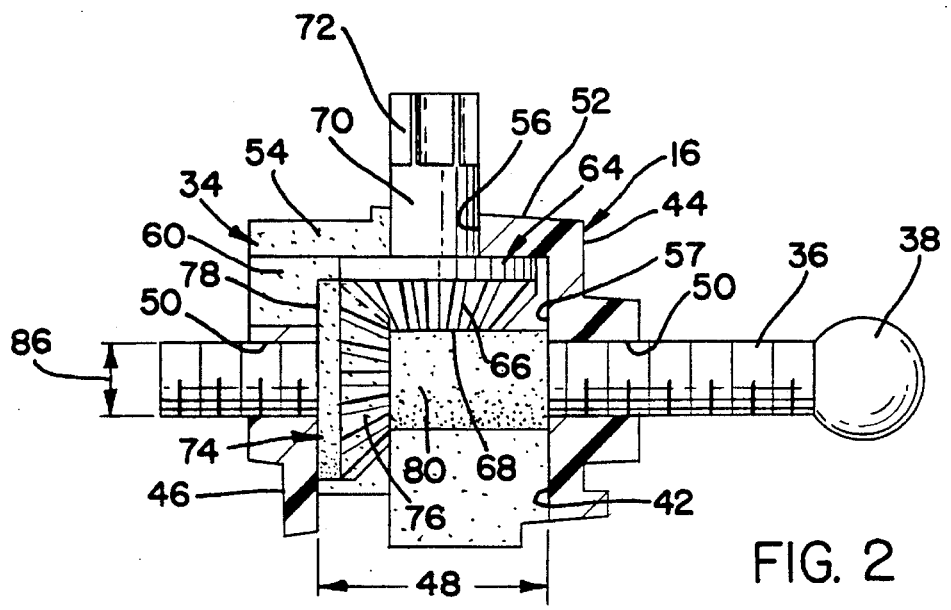
FIG. 2 is a sectional view through the horizontal adjustment device shown in FIG. 1.
Figure 3:
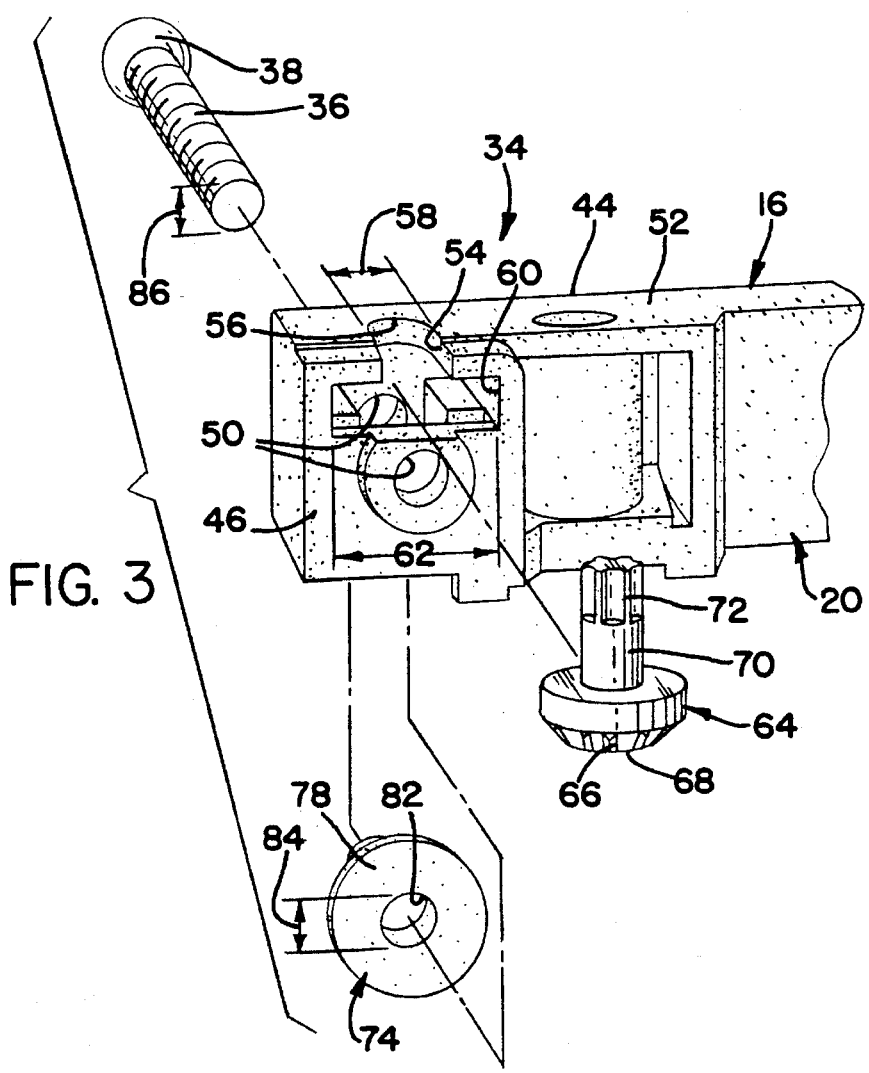
FIGS. 3 and 4 are exploded rear and bottom perspective views of the horizontal adjuster unit shown in FIG. 2.
Figure 4:
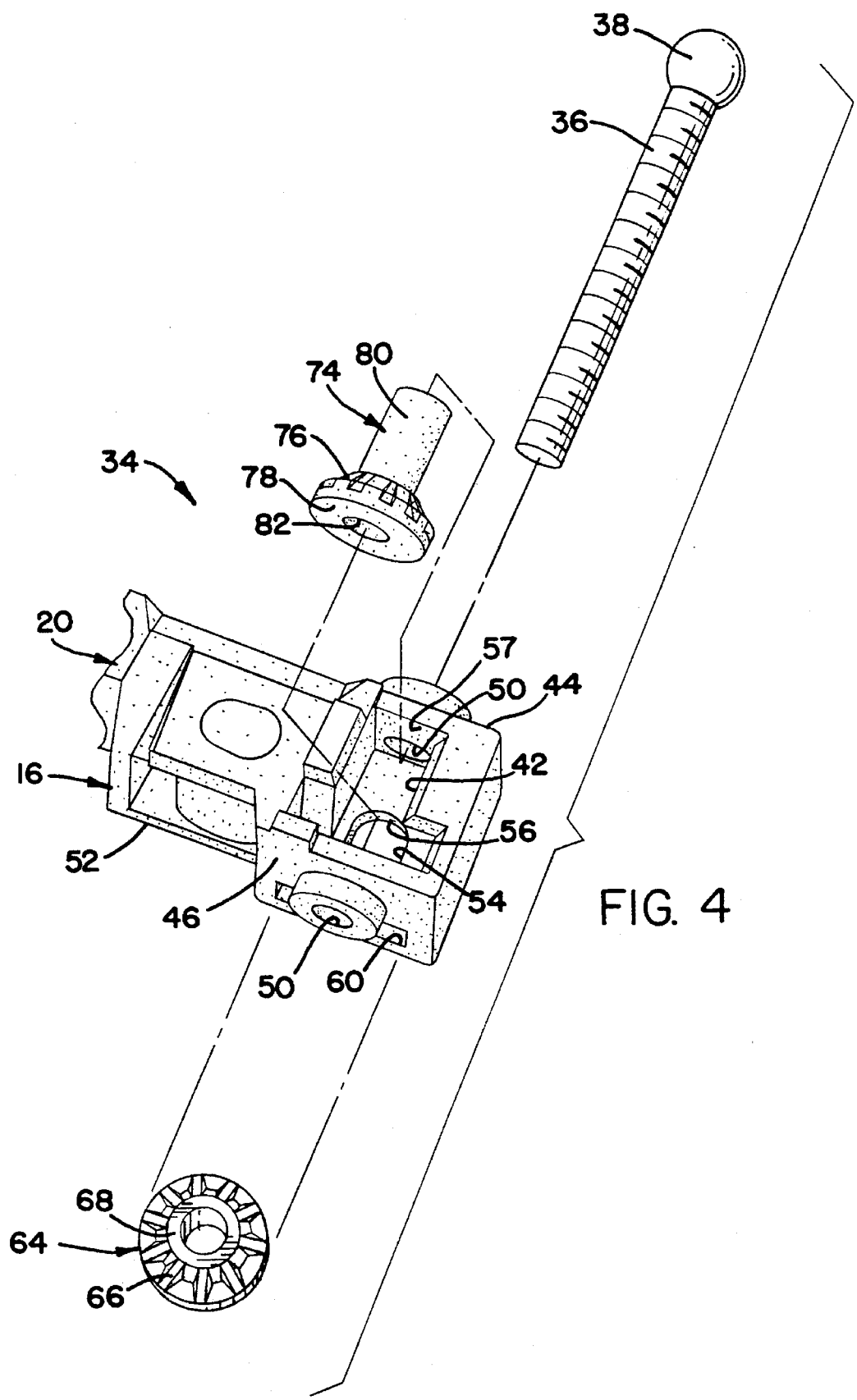

Referring additionally to FIGS. 2, 3 and 4, the horizontal adjustment device 34 utilizes the horizontal arm 20 as the housing. The housing has a T-shaped opening 42. The T shape of opening 42 is not required for functionality of the invention. However, it does make assembly easier. The housing of the adjustment device 34 has a first wall 44 and a second rear wall 46 which are spaced apart by a first dimension 48. The first and second walls have a generally aligned through bore 50. The horizontal bracket 20 also has a top 52 with a slot 54 with an extreme end 56 and a width 58 of a second dimension. The slot 54 intersects the rear wall 46. The rear wall 46 in an area closely adjacent to the top 52 has a slot 60 with a third dimension 62 which is greater than the second dimension 58.

Insertable within the slots 54 and 60 is a top gear 64. The top gear is fabricated from a zinc die cast. Top gear 64 has a bevelled head 66 with a flat 68. The head 66 has a diameter of a fourth dimension. Joined to the bevelled head is a shaft 70 having an end 72 generally opposite the head 66 with a surface for receipt of torsional input from a wrench or socket. The top gear shaft 70 has a diameter of a fifth dimension closely approximate the second dimension and less than the fourth dimension.

The head 66 of the top gear 64 is passable through the horizontal slot 60. In the assembly of the adjuster mechanism 34, the top gear 64 is first inserted through the slot 60 in rear wall 46, ideally to a point where the shaft 70 is contacted by the extreme end 56 of the slot 54.

After placement of the top gear 64, a fiberglass-reinforced nylon sleeve gear 74 is inserted into the horizontal arm 20 via opening 42. Sleeve gear 74 has a bevelled gear head 76 with a flat 78. Fixably connected to the sleeve gear 74 is a barrel body 80 which supports the top gear 64 in a position adjacent the top 52 and contacting the same. The sleeve gear head 76 and barrel body 80 have a bore 82 with a diameter of a sixth dimension 84. To allow the sleeve gear to capture the top gear in position, the shaft 36 is threadably inserted within the sleeve gear 74. The shaft 36 has a diameter 86 of a seventh dimension greater than that of the sixth dimension so that the sleeve gear 74 will have an interference fit therewith. This interference fit may be modified by modifying portions of the bore 82 so that not all of the sleeve gear engages with the shaft 36. The sleeve gear 74 also has a lengthwise dimension roughly approximating that of the first dimension 48.

In operation, after assembly of the parts, the top gear 64 is rotated, imparting rotation to the sleeve gear 74, thereby translating shaft 36 in a longitudinal fashion to horizontally adjust reflector body 10. Five to 20 inches lbf of torque are required to effect adjustment.

To control friction between the gears 64 and 74, the top gear 64 is limited toward the right by contact of shaft 70 with slot end 56 (FIG. 2) instead of the head 66 contacting a housing inner wall surface 57. To avoid flutter, the tolerance between length 48 and the length of the sleeve gear 74 is held to ±0.05 mm.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle headlamp assembly comprising:

a reflector housing supporting a light source adapted to be adjusted in a vertical plane and in a horizontal plane for aiming a light beam provided by the reflector when the light source is energized;

a first adjustment device for adjusting the position of the reflector in the vertical plane;

a second adjustment device for adjusting the position of the reflector in the horizontal plane, the second adjustment device including:

an adjuster housing having an open bottom and a first front wall and a second rear wall separated by a first dimension, the first and second walls having an aligned bore, the adjuster housing also having a top with a slot with a width of a second dimension intersecting one of the walls, the wall intersected by the top slot having a horizontal slot adjacent the top slot having a width of a third dimension, greater than the second dimension;

a top gear having a bevelled head with a flat, the head having a diameter of a fourth dimension passable through the horizontal slot, the top gear also having a fixably connected shaft with a diameter of a fifth dimension less than the fourth dimension, the shaft being generally aligned with the second dimension of the slot in the adjuster housing top, the shaft having on an end opposite the top gear head a surface for reception of a torque input;

a sleeve gear insertable through the adjustment device housing bottom, the sleeve gear having a bore having a diameter of a sixth dimension, the sleeve gear having a bevelled head with a flat top for meshing engagement with the top gear head, the sleeve gear having connected to the bevelled sleeve gear head a barrel body for supporting the head of the top gear in a position to cause the top gear head to be contacted with the top of the second adjustment device housing and to be captured in position, the sleeve gear having a length approximating the first dimension; and a threaded shaft having a diameter of a seventh dimension larger than the sixth dimension extending through the bore of the first and second walls and sleeve gear, the shaft having an end for attachment of the reflector housing, the shaft being moved longitudinally with respect to the second adjustment device housing by rotation of the top gear to adjust the reflector body in a horizontal orientation.

2. A headlamp assembly as described in claim 1 wherein the bottom opening of the second adjustment device housing has a T shape.

* * * * *

UNITED STATES PATENT AND TRADEMARK OFFICE
CERTIFICATE OF CORRECTION

PATENT NO.  : 5,483,426
DATED       : January 9, 1996
INVENTOR(S) : Brian S. Lewis; Gary L. Miller It is certified that error appears in the above-identified patent and that said Letters Patent is hereby corrected as shown below:

Title page of patent, after "Filed:" should read -- December 27, 1994 --.

Signed and Sealed this

Fourteenth Day of May, 1996

Attest:

BRUCE LEHMAN

*Attesting Officer*   *Commissioner of Patents and Trademarks*